United States Patent [19]

Staudinger

[11] Patent Number: 4,590,049
[45] Date of Patent: May 20, 1986

[54] METHOD FOR DRY DESULFURIZATION OF EXHAUST GAS

[76] Inventor: Gernot Staudinger, Kserinpasse 37, A8010 Graz, Austria

[21] Appl. No.: 640,608

[22] Filed: Aug. 14, 1984

[30] Foreign Application Priority Data

Aug. 16, 1983 [AT] Austria ................................. 2935/83

[51] Int. Cl.$^4$ ........................... C01B 17/00; B01J 8/00
[52] U.S. Cl. ..................................... 423/244; 423/242; 110/343; 110/345
[58] Field of Search .......... 423/242 R, 242 A, 244 A, 423/244 R; 110/343, 345

[56] References Cited

U.S. PATENT DOCUMENTS

| | | | |
|---|---|---|---|
| 3,481,289 | 12/1969 | Oda et al. ............................. | 160/345 |
| 4,185,080 | 1/1980 | Rechmeier ........................... | 423/242 |
| 4,329,324 | 5/1982 | Jones .................................... | 110/345 |
| 4,387,078 | 6/1983 | Lin ....................................... | 423/244 |

*Primary Examiner*—Gregory A. Heller
*Attorney, Agent, or Firm*—Steinberg & Raskin

[57] ABSTRACT

A method for desulfurizing exhaust gases such as flue gases from steam generators that have been charged with brown coal, in which powdered lime is charged into the furnace and then removed or precipitated from the flowing exhaust gases after a certain reaction time. The dust or particulate matter which has been removed from the flowing exhaust gas stream, and which is at least partially charged with noxious substances along the surfaces thereof, is pulverized and then subjected to dry stream hydration, followed by recycling into the flue gas stream which has been cooled to a lower temperature. During the dry steam treatment, the points of fracture or exposure of the pulverized particulate additive are activated so that Ca(OH)$_2$ formation takes place, which has a high affinity for sulfur dioxide at low temperature. An apparatus for pulverizing and hydrating the particulate matter is also provided.

12 Claims, 2 Drawing Figures

METHOD FOR DRY DESULFURIZATION OF EXHAUST GAS

BACKGROUND OF THE INVENTION

The present invention generally relates to desulfurization of flue gases of a steam generator, such as in a caloric power plant, as well as to the production of construction material formed of synthetic gypsum. More particularly, the present invention relates to a method for desulfurizing the ash-containing exhaust gas of the flue gases, especially in connection with the application or burning of brown coal, where the furnace is charged with powdered lime that is split into CaO and $CO_2$, the CaO being transformed into $CaSO_3$ or $CaSO_4$ by absorption of $SO_2$ and an excess of air ($O_2$), at least on the surface of the powder particles thereof, and the powder particles being separated from the exhaust gas along with the ash particles. The present invention is also directed to an apparatus for pulverizing and separating ash-containing particulate matter.

A method for desulfurizing flue gas is already known in which the furnace is charged with limestone which reacts with the $SO_2$ within the flue gas after splitting into CaO. During this method, the charged limestone ($CaCO_3$) is split into calcium oxide (CaO) and carbon dioxide ($CO_2$), with the calcium oxide (CaO) reacting with the sulfur dioxide ($SO_2$) of the flue gas and one-half mole of oxygen ($O_2$) to form calcium sulfate ($CaSO_4$). However, this method is disadvantageous in that only one-tenth of the charged calcium is utilized, while the remaining 90% of the calcium is precipitated with the ash and the formed calcium sulfate.

Extension of contact time between flue gas and the limestone additive has been attempted by extending the time of direct contact of the particulate or dust contained in the dust filter with the flue gas, in order to achieve more efficient utilization of the limestone additive. However, calcium oxide (CaO) is very inactive within the normal operating temperature range of the filter, which is about 120° to 160° C. Appreciable improvement in utilization of the limestone additive can still be attained by cooling the flue gas to a temperature between 50° and 100° C., and by additionally increasing the relative humidity.

German Patent DE-OS No. 29 34 109 discloses that wet and dry slag and ash resulting from the furnace may be pulverized and, together with the absorbent, added to exhaust gas at various locations. This is disadvantageous in that milling of slag and ash can consume a great deal of energy, resulting in uneconomical production.

DE-OS No. 29 10 537, discloses that absorbents can be pulverized in a flow of steam and again added directly to the exhaust gas without valence saturation. This method results in a slightly better utilization of the absorbent, since only valences exposed at the broken or fractured surfaces, and ideally a molecular layer, are available for bonding of a gas molecule. The reaction product formed at the surfaces thereof immediately forms impermeable layer, even on a reactive sorbent such as calcium hydroxide ($Ca(OH)_2$). With limestone ash as the additive, the effect of simple pulverization in a jet mill and immediate charging into the flue gas current is particularly low, since a transformation of calcium oxide into calcium hydroxide with the steam of the flue gas would additionally have to occur. This transformation can take place only in the absence of carbon dioxide and sulfur dioxide, in other words in a pure water vapor atmosphere and with adequate contact time. Another known process is where the dust-like sorbent, instead of being fed directly into the furnace, is initially fed into the utilized gas stream and is cooled down to 120° to 160° C., in order to improve the efficiency of the solid sorbent. The sorbent is brought into contact with the flue gas several times in this particular method, with the sorbent being precipitated out over and over again. This particular process can be further improved upon, if the precipitated sorbent is moistened prior to being combined with the flue gas. The humidity content of the sorbent is simultaneously increased to 10%. Moistening can be carried out by way of wet steam in a continuous conveyor furnace where condensation takes place, or by treating the powderized lime sorbent with wet air. Utilization with slaked lime sorbent illustrates that in a contact path developed as a venturi path, the utilization of slaked lime as well as the overall degree of the sulfurization could be improved if the sorbent is slightly moistened.

This known process is not suitable for application of lime ash additive, since the remaining calcium oxide is virtually inactive at the particular temperature of 120° to 160° C. Treating the ash with steam as has been suggested may be adequate to stimulate the bonding of calcium hydroxide and sulfur dioxide, but it is inadequate for transforming the calcium oxide into the calcium hydroxide which is an indispensible intermediate reaction step for the subsequent bonding of the sulfur dioxide. While slaked lime is an extremely active, although very costly, absorbent, cooling of the flue gas below 100° C. means that the flue gas might ultimately have to be reheated before exiting from the flow system, e.g. flowing out of a chimney, if it is required to satisfy local conditions. Humidity treatment of sorbents and possibly of ash can result in considerable stoppages, for even a small excess of water or minor inhomogeneity can cause sticking and caking of the dust-like sorbent.

SUMMARY OF THE INVENTION

Accordingly, it is an object of the present invention to improve desulfurization of exhaust or flue gas of a sulfur-containing coal.

It is also an object of the present invention to improve the efficiency of absorbent utilized in the desulfurization of exhaust gas from sulfur-containing coal.

It is another object of the present invention to reduce the overall quantity of absorbent that is required in the desulfurization of exhaust or flue gas of sulfur-containing coal.

It is a further object of the present invention to attain the desired degree of precipitation of sulfur and sulfur-containing compounds in the flowing flue or exhaust gas from sulfur-containing coal onto the absorbent, followed by concomitant removal of the absorbent from the flowing gas stream with the sulfur or sulfur-containing compounds precipitated thereon.

It is still another object of the present invention to reduce the overall zone required for precipitation and removal of sulfur and sulfur-containing compounds from the flow of exhaust or flue gas.

It is still a further object of the present invention to improve the overall quality of base products for the construction industry by increasing the calcium sulfite and calcium sulfate content of such building material.

It is yet another object of the present invention to begin desulfurization of exhaust or flue gas from sulfur-containing coal directly within the combustion chamber with an absorbent formed therein.

It is yet another object of the present invention to continue desulfurization of the flowing exhaust or flue gas in the cooler exhaust gas zone outside of the combustion chamber with an absorbent produced by dust such as coal, ash and partially-combusted absorbents that have been precipitated by hydration.

These and other objects are attained by the present invention which provides a method for the desulfurization of ash-containing exhaust gas of a sulfur-containing coal in a coal burning, steam generating furnace, which comprises:

charging the furnace with powdered limestone which during the burning of the coal is split into calcium oxide particles and carbon dioxide, the calcium oxide particles absorbing sulfur dioxide resulting from the burning of the sulfur-containing coal and forming particles with calcium sulfite or calcium sulfate on at least the surfaces thereof;

separating particulate matter, including calcium oxide without and calcium oxide with calcium sulfite or calcium sulfate on at least the surfaces thereof, from the exhaust gas;

mechanically crushing the thus-separated particulate matter;

subjecting the thus-separated and crushed particulate matter to dry steam hydration to convert calcium oxide to calcium hydroxide; and recycling particles of the thus-obtained calcium hydroxide, calcium sulfite and calcium sulfate to the exhaust gas.

The present invention also provides an apparatus for pulverizing and hydrating ash-containing particles, comprising separating means for separating the particles from a flowing gas stream, at least one nozzle disposed in a base of said separating means for injecting steam thereinto, whereby the separated particles are pulverized and hydrated, the base of said separating means being in the shape of a funnel, a recycle line extending from the funnel-shaped base of said separating means back to the flowing gas stream, and a line for removing excess or saturated particles from said separating means or said recycle line.

According to the present invention, the disadvantages encountered with the previously-described prior art processes can be avoided by hydrating the dust and ash particles, i.e. the limestone particles, by means of steam, and by subsequently recycling the same into the exhaust gas current. Desulfurization of the flowing flue or exhaust gas is begun directly in the combustion chamber with absorbent formed therein, and continued as the exhaust or flue gas flows out from the combustion chamber with the absorbent produced by the dust and ash particles having been hydrated by means of steam, i.e. dry steam.

The calcium hydroxide has a strong affinity for sulfur dioxide at low temperatures, such as the cooler temperatures of the flowing flue gas in the stream. As a result, more sulfur dioxide can be hydrated by the addition of the calcium hydroxide into the flowing flue gas stream. Thus, with the present invention, the degree of desulfurization is improved from a previous maximum of 50% to 80-90%, while maintaining the same quantity of additives. This process offers a considerable reduction of the specific use of powdered lime in view of the greatly enhanced absorbed $SO_2$ quantity. The present invention also neutralizes problems encountered in precipitation or removal of the dust like particulate matter from the flowing fluid stream, especially facilitating the further processing of gypsum, due to the higher sulfur dioxide or sulfur trioxide content.

BRIEF DESCRIPTION OF THE DRAWINGS

These and other objects of the present invention will become apparent by way of the following description, with reference to the accompanying drawings, in which.

DETAILED DESCRIPTION OF THE PREFERRED EMBODIMENTS

Figure 1:
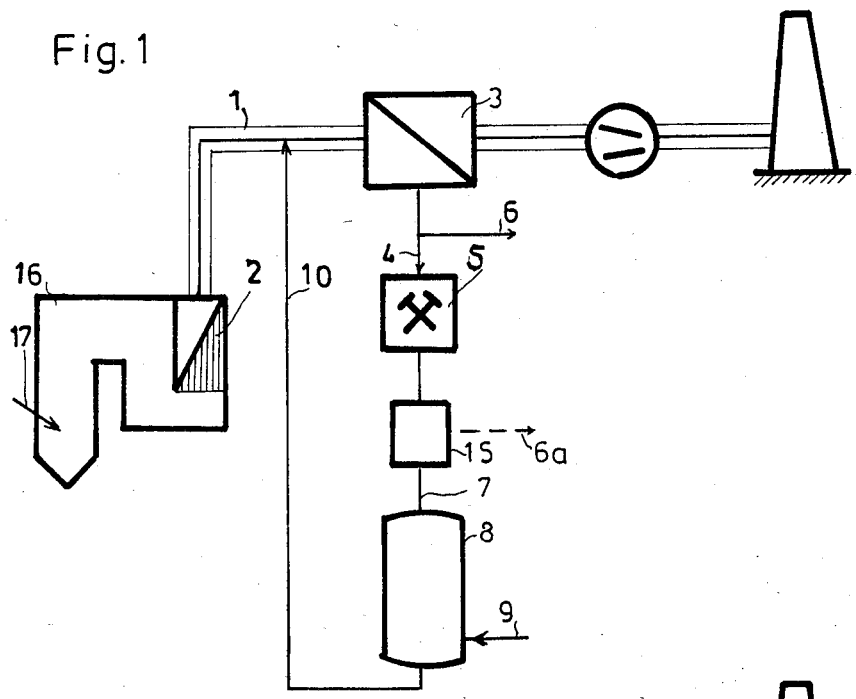
FIG. 1 is a schematic illustration of one embodiment of the present invention.

It has been surprisingly found that flue ash from coal furnaces, after being hydrated, can be used as an absorbent which leads to reduction in the overall quantity of absorbents that would otherwise have to be utilized. Thus, the problem connected with the precipitation of ash and utilized absorbent is reduced by the present invention. As a result, the calcium oxide contained in the ash can be transformed by means of steam, into reactive form, namely calcium hydroxide, in a completely dry state without the slightest trace of humidity. During the reaction, $CaO + SO_2 + 0.5O_2 \rightarrow CaSO_4$, excess air is generated within the furnace which impedes further reaction with the sulfur dioxide. The 15% $CO_2$ portion contained in the flue gas forms, at low temperature, a $CaCO_3$ layer along the surface of the particles, this layer being impermeable. If merely dry steam is supplied for the $CaO + H_2O$ reaction, the steam must first be diffused into the $CaSO_4$ or $CaCO_3$ layer, before the steam is capable of reacting with the remaining CaO. The reaction rate is limited by the diffusion rate of the steam penetrating this layer. Due to the mechanical crushing of ash before and after the reaction, a new surface which is not covered by such a layer is exposed, where calcium hydroxide formation can take place for further reaction to calcium sulfite. At an exhaust gas temperature of below 300° C., calcium sulfite formation is possible even with an excess of air.

This is advantageous in that after disintegration of the dust/limestone ash additives, the larger particles are precipitated and removed so that the material which has not been pulverized and would react only with great difficulty, can be removed from the system. Moreover, pulverization can take place, for example, in a jet mill by means of the dry steam required for treatment. This is especially advantageous since the jet mill especially pulverizes the soft calcium oxide particles, while the hard ash particles are pulverized to a somewhat lesser degree.

Then, the pulverized, dry steam-treated lime absorbent can be recycled to the flowing exhaust gas stream, which has already been cooled down to the requisite exit temperature (i.e. the chimney exhaust temperature), as a result of which all reactants have the same temperature from the start. A dry steam flow can also be utilized for recycling the pulverized, steam-treated limestone additive. The dry steam simultaneously serves not only as a transfer medium, but also as a reactant for transforming the calcium oxide into calcium hydroxide, also resulting in greater utilization of the applied limestone additive. In order to maintain the ash content of the system at a constant level, the quantity of ash and lime dust removed before pulverization must be replenished in equal quantities.

The separated and crushed matter can be subjected to dry steam hydration for a period of time from 2 to 24 hours, and at a pressure slightly greater than atmospheric pressure.

Referring to the figures, notably FIG. 1, powdered lime is fed into the furnace of the steam boiler 16 as indicated by arrow 17, with the coal ash together with the flue gas stream 1 and the utilized lime additive being exhausted from an air preheater 2 of the steam boiler 16. This flowing stream enters a dust separator 3 which in the present embodiment is a bag filter, with all of the dust being precipitated out or removed from the flowing flue gas stream.

A partial current 4 of the precipitated or removed dust is fed, according to a variant of this embodiment, to a mill 5, for example a ball mill, where the dust is mechanically pulverized in order to break up the limestone particles therein. The remainder of the dust is removed as a second partial current 6 in a conventional manner as indicated in FIG. 1. The pulverized dust enters a damper 8 from the mill where the dust is then treated with dry, hot steam 9 in order to form reactive calcium hydroxide, $Ca(OH)_2$. This treated dust or particulate matter 10 is then recycled into the flue gas current 1, as illustrated in FIG. 1.

The operating temperature of the damper 8 is above boiling temperature of water in order to ensure a dry operation therein, because this type of lime-containing dust or particulate mixture hardens to concrete-like crust upon contact with water in its liquid state. On the other hand, the operating temperature of the damper 8 should be as close as possible to the boiling point of water, for this will produce the most rapid $CaO + H_2O \rightarrow Ca(OH)_2$ transformation.

In another variation of the present invention, as indicated by the dotted lines in FIG. 1, excess ash need not necessarily be branched as excess current 6 from the flowing stream 4 to the mill 5, but rather the entire flowing particulate matter stream may be passed through a sifter 15 after the mill 5, with the excess ash then being branched off from the flowing stream as stream 6a after the mill 5 (please see the dotted lines in FIG. 1). At this point, the particulate material which has not been pulverized is unsuitable as an absorbent, and can be extracted from the entire cycle since this material is primarily composed of harder substances such as $SiO_2$, and $Al_2O_3$ which do not react with $SO_2$. The pulverized dust 7 is then directed to damper 8 in a similar manner as noted above.

Figure 2:
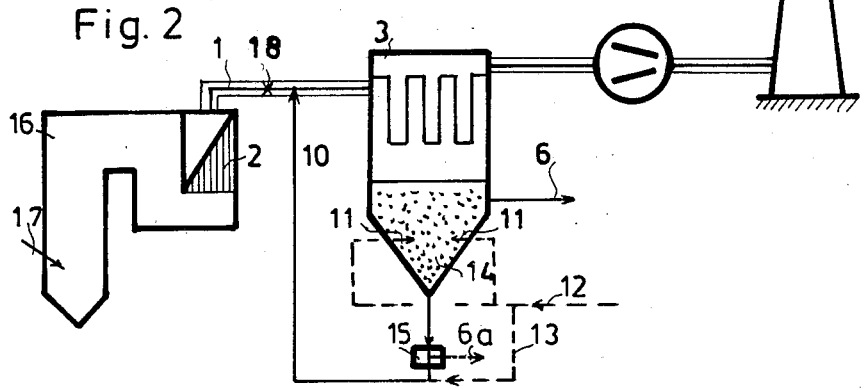
FIG. 2 is a schematic illustration of another embodiment of the present invention.

In the embodiment of the present invention illustrated in FIG. 2, several of the operations of the embodiment illustrated in FIG. 1 are performed in a single apparatus and are thus considerably integrated with respect to one another. Similar features are indicated by similar references numerals. In the embodiment of FIG. 2, the flue gas stream 1 is again directed from the air preheater 2 into the dust separator 3, with the entire quantity of dust or particulate matter flowing therein being precipitated or removed from the flowing exhaust gas stream. The excess portion of particulate matter and limestone powder is precipitated or removed through the partial current 6 in the same manner as with respect to the embodiment of FIG. 1.

The pulverization of the dust or particulate mixture does not take place in a separate mill in the embodiment illustrated in FIG. 2, but rather in a base portion 14 of the dust separator 3 itself, where two gas jets 11 face one another as in a conventionally known jet mill.

It is especially advantageous to operate the jet mill with dry steam 12, since this not only achieves the pulverization of particulate matter in the dust mixture, but the steam simultaneously serves as a reactant for exposed CaO. A jet mill has been proven to be especially advantageous as indicated, because the mill effectively pulverizes the soft CaO particles, while the harder ash particles are attacked to a lesser degree. Dry steam is also used for recycling the pulverized material for mixing with the flue gas current flow 1. This serves, as has been indicated above, not only as a transfer medium, but also as a reactant for transforming the CaO.

The steam current 3 emerging from jet nozzles 11 escapes through the layer of ash accumulated in the base portion 14 of the dust separator 3, so that the gaps between the dust particles are completely filled with steam. Thus, not only does pulverization of the particulate matter take place, but also the transformation reaction $CaO + H_2O \rightarrow Ca(OH)_2$ simultaneously takes place in the base portion 14 of the dust separator 3. A two hour minimum reaction time has been determined for various types of limestone.

In another variation of the embodiment of the present invention illustrated in FIG. 2, the excess ash portion can be drawn off not only as current 6 prior to reaction with the dry steam, but also as current 6a after the pulverized and treated particulate flow has passed through a sifter 15, as illustrated by the dotted line in FIG. 2. Concerning the operating temperature of this embodiment, similar operation temperatures are utilized as in the embodiment illustrated in FIG. 1, with respect to the layer of ash deposited in the base portion 14 of the duster 3, the dry steam current 13, and the treated dust recycle 10. It is also possible to use gas instead of steam for charging the absorbent, or to provide a mechanical inlet, within the context of the present invention.

The present invention will be further explained by way of the following examples.

EXAMPLE 1

Three similar ash samples were taken from the flowing flue gas stream 1 prior to the second desulfurization step which was performed in the bag filter 3, and were prepared differently as follows.

The first sample, designated no. 103, was pulverized and then treated for 24 hours with dry steam at atmospheric pressure according to the present invention, and then chemically analyzed after desulfurization. The second sample, designated no. 108, was not pulverized but was treated for 24 hours with dry steam, and also analyzed after desulfurization. The third such sample, designated no. 102, was neither pulverized nor treated with steam (it was also analyzed after the desulfurization step).

The results of the analysis following desulfurization are listed in the following table 1:

TABLE I

| | Ash Analyses (Data in Weight %) Sample No. | | |
|---|---|---|---|
| | 103 | 108 | 112 |
| $SiO_2$ | 27.92 | 30.35 | 32.09 |
| $R_2O_3$ (metallic oxide) | 20.86 | 23.01 | 23.91 |

TABLE I-continued

| | Ash Analyses (Data in Weight %) Sample No. | | |
|---|---|---|---|
| | 103 | 108 | 112 |
| CaO | 24.26 | 27.33 | 27.78 |
| MgO | 3.09 | 2.20 | 2.47 |
| $SO_3$ | 9.73 | 6.85 | 5.28 |
| Loss due to burning | 11.65 | 8.84 | 7.13 |
| $H_2O$ | 1.77 | 0.34 | 0.28 |
| Total | 99.28 | 98.92 | 98.94 |
| S:Ca | 0.280 | 0.175 | 0.133 |

It is thus quite evident that with sample no. 103 which was prepared according to the present invention, 28% of the calcium was utilized for $SO_2$ bonding, whereas with sample no. 108 only 17.5% of the calcium was utilized for $SO_2$ bonding, and with sample no. 112 only 13.3% of the calcium was utilized for $SO_2$ bonding.

EXAMPLE 2

18 mg of brown coal of the following analysis:

| C | 36.08% |
|---|---|
| H | 2.83 |
| O | 12.26 |
| N | 0.34 |
| S | 0.59 |
| $H_2O$ | 36.58 |
| ash | 11.39 | and having a lower heating value of 12,774 KJ/kg, are burned per hour in the furnace of a steam boiler 16 in the embodiment illustrated in FIG. 2, resulting in an 80 mg stream generation. The furnace is charged hourly with 1.8 mg powdered lime as indicated by arrow 17 in FIG. 2, this lime having the chemical analysis:

| $CaCO_3$ | 97.3% |
|---|---|
| $MgCO_3$ | 0.2 |
| $Fe_2O_3$ | 0.1 |
| $Al_2O_3$ | 0.2 |
| $SiO_2$ | 2.2 | and a powder fineness of 90 weight percent which is less than 60 microns and of 50 weight percent which is less than 20 microns. The flue gas is freed from dust particulates by the bag filters 3, with the steam current flowing at 2 mg/H.

At the location designated by numeral 18 in FIG. 2, a gas sample and an ash sample are taken from the flowing flue gas current 1, followed by chemical analysis of the respective samples. A sample of the purified gas stream after filtering through filter 3 was then taken, analyzed and compared with the gas analysis from the sample at location 18, while a sample of the ash flowing through current 6 was also taken, analyzed, and compared with the analysis of the ash sample taken at location 18. The results of these analyses are listed below in Tables 2 and 3 respectively:

TABLE 2

| Dry Gas Sample in Vol. % | |
|---|---|
| Location 18 | Pure Gas After Filtering |
| $CO_2$ 13.04 vol. % | 13.00 |
| N 80.78 vol. % | 80.83 |
| $O_2$ 6.14 vol. % | 6.16 |
| $SO_2$ 0.04 vol. % | 0.013 |

TABLE 3

| | Ash Sample in Vol. % | |
|---|---|---|
| | Location 18 | From Partial Current 6 |
| $SiO_2$ | 33.80 | 30.35 |
| $R_2O_3$ (metallic oxide) | 25.60 | 23.01 |
| CaO | 30.00 | 27.33 |
| MgO | 2.50 | 2.20 |
| $SO_2$ | 4.00 | 6.85 |
| Loss Due To Burning | 4.00 | 8.84 |
| $H_2O$ | 0.10 | 0.34 |

The entire ash current or flow (equal to ash+burned powdered lime+desulfurization produce) was 3.24 mg/H. Together with the coal, 106.2 kg/hr sulfur was fed into the furnace and together with the ash in partial current 6, 88.77 kg/hr was discharged. Since an additional 1.3 kg/hr sulfur was discharged with the 162 kg/hr boiler ash (2% $SO_3$), total sulfurization was calculated as follows:

$$(88.77 + 1.3)/106.2 = 84.8\%.$$

The preceding description of the present invention is merely exemplary, and is not intended to limit the scope thereof in any way.

What is claimed is:

1. Method for the desulfurization of ash-containing exhaust gas of a sulfur-containing coal in a coal burning, steam generating furnace, which comprises:
   charging the furnace with powdered limestone which during the burning of the coal is split into CaO particles and $CO_2$, the CaO particles absorbing $SO_2$ resulting from the burning of the sulfur-containing coal and forming particles with $CaSO_3$ or $CaSO_4$ on at least the surfaces thereof;
   separating particulate matter, including CaO without and CaO with $CaSO_3$ or $CaSO_4$ on at least the surfaces thereof, from the exhaust gas;
   mechanically crushing the thus-separated particulate matter, whereby CaO of the particles becomes exposed;
   classifying the particulate matter into larger and smaller particles;
   subjecting the thus-separated and crushed particulate matter to dry steam which reacts with the exposed CaO to hydrate the same and convert the CaO into $Ca(OH)_2$; and
   recycling particles of the thus-obtained $Ca(OH)_2$, $CaSO_3$, and $CaSO_4$ to the exhaust gas at an exhaust gas temperature which has been cooled to substantially the outlet temperature of the gas.

2. The method of claim 1, wherein the particulate matter is classified by
   sifting the thus-separated and crushed particulate matter after the mechanical crushing thereof; and
   removing the particles of particulate matter retained on the sieve after the sifting thereof.

3. The method of claim 1, comprising
   subjecting the thus-separated and crushed particulate matter to dry steam hydration for a period of time from 2 to 24 hours.

4. The method of claim 3, comprising
   subjecting the thus-separated and crushed particulate matter to dry steam hydration at a pressure slightly greater than atmospheric pressure.

5. The method of claim 1, wherein the thus-obtained particles are recycled by application of dry steam thereto.

6. The method of claim 1, wherein the thus-separated particulate matter is mechanically crushed in a ball mill, and the thus-separated and crushed particulate matter is subjected to the dry steam hydration in a damper.

7. The method of claim 1, wherein the particles are recyeled to the exhaust gas downstream of the furnace and upstream of the separation of the particulate matter from the exhaust gas.

8. The method of claim 7, wherein the particles are recycled to the exhaust gas at an exhaust gas temperature below about 300° C.

9. Method for the desulfurization of ash ccontaining exhaust gas of a sulfur-containing coal in a coal burning, steam generating furnace, which comprises charging the furnace with powdered limestone which during the burning of the coal is split into CaO particles and $CO_2$, the CaO particles absorbing $SO_2$ resulting from the burning of the sulfur-containing coal and forming particles with $CaSO_3$ or $CaSO_4$ on at least the surfaces thereof;

separating particulate matter, including CaO without and CaO with $CaSO_3$ or $CaSO_4$ on at least the surfaces thereof, from the exhaust gas;

crushing the thus-separated particulate matter, whereby CaO of the particles becomes exposed;

subjecting the thus-separated and crushed particulate matter to dry steam which reacts with the exposed CaO to hydrate the same and convert the CaO to $Ca(OH)_2$;

classifying the particulate matter into larger and smaller particles after subjecting the same to the dry steam hydration; and recycling particles of the thus-obtained $Ca(OH)_2$, $CaSO_3$ and $CaSO_4$ to the exhaust gas at an exhaust gas temperature which has been cooled to substantially the outlet temperature of the gas.

10. The method of claim 9, wherein the thus-separated and crushed particulate matter is subjected to dry steam hydration in a base portion of a fluidized bed provided with at least one nozzle means for introducing the dry steam into the fluidized bed.

11. The method of claim 9, wherein the particulate matter is classified by sifting the thus-obtained particles after subjecting the same to the dry steam hydration; and removing the particles retained on the sieve after the sifting thereof.

12. The method of claim 11, wherein the thus-obtained particles are recycled by application of dry steam thereto.

* * * * *